US012760533B2

(12) United States Patent
Lv et al.

(10) Patent No.: US 12,760,533 B2
(45) Date of Patent: Oct. 13, 2026

(54) FLOOR SLAB UNIT WITH CHAMFERS, PROCESSING METHOD, AND PROCESSING DEVICE

(71) Applicants: Jian Lv, Wuxi City (CN); Huaizan Dou, Wuxi City (CN); Chaoguo Fang, Shanghai (CN)

(72) Inventors: Jian Lv, Wuxi City (CN); Huaizan Dou, Wuxi City (CN); Chaoguo Fang, Shanghai (CN)

( * ) Notice: Subject to any disclaimer, the term of this patent is extended or adjusted under 35 U.S.C. 154(b) by 196 days.

(21) Appl. No.: 18/422,329

(22) Filed: Jan. 25, 2024

(65) Prior Publication Data

US 2025/0198171 A1 Jun. 19, 2025

(30) Foreign Application Priority Data

Dec. 19, 2023 (CN) ......................... 202311743515.6

(51) Int. Cl.
*E04F 15/10* (2006.01)
*B27M 3/04* (2006.01)
(Continued)

(52) U.S. Cl.
CPC ............. *E04F 15/107* (2013.01); *B27M 3/04* (2013.01); *B32B 3/06* (2013.01); *E04F 15/02033* (2013.01); *B32B 2255/28* (2013.01); *B32B 2307/102* (2013.01); *B32B 2307/4023* (2013.01); *B32B 2307/406* (2013.01); *B32B 2307/538* (2013.01); *B32B 2307/554* (2013.01);
(Continued)

(58) Field of Classification Search
CPC .............. E04F 15/107; E04F 15/02033; E04F 15/02038; B32B 3/06; B32B 2255/28; B32B 2307/102; B32B 2307/4023; B32B 2307/406; B32B 2307/538; B32B 2307/554; B32B 2307/584; B32B 2307/71; B32B 2419/04; B27M 3/04; B44F 9/02
See application file for complete search history.

(56) References Cited

U.S. PATENT DOCUMENTS

2021/0363759 A1* 11/2021 Baert .................. E04F 13/0866

FOREIGN PATENT DOCUMENTS

JP 2015148117 A * 8/2015

OTHER PUBLICATIONS

Translation of JP2015148117A (bib, description and claims). (Year: 2015).*

* cited by examiner

*Primary Examiner* — Catherine A. Simone
(74) *Attorney, Agent, or Firm* — Olive Law Group, PLLC

(57) ABSTRACT

The disclosure belongs to the field of board processing, and specifically relates to a floor slab unit with chamfers, a processing method, and a processing device. The floor slab unit includes at least a substrate layer and a finish paint layer disposed sequentially. The floor slab unit includes a body area and a chamfered areachamfered area formed on at least one edge, the finish paint layer thickness of the chamfered area is equal to that of the body area, and the difference between the surface glossiness of the chamfered area and the surface glossiness of the body area is no more than 1. Through the specific processing device and method, the disclosure solves the problem that the connection strength of floor slab units is reduced, while ensuring overall visual effect improvement. Moreover, surface performance is not affected, and better three-dimensional effects and overall texture are achieved.

3 Claims, 2 Drawing Sheets

(51) Int. Cl.
*B32B 3/06* (2006.01)
*B44F 9/02* (2006.01)
*E04F 15/02* (2006.01)

(52) U.S. Cl.
CPC ..... *B32B 2307/584* (2013.01); *B32B 2307/71* (2013.01); *B32B 2419/04* (2013.01); *B44F 9/02* (2013.01); *E04F 15/02038* (2013.01)

FLOOR SLAB UNIT WITH CHAMFERS, PROCESSING METHOD, AND PROCESSING DEVICE

CROSS REFERENCE TO RELATED APPLICATION

This application claims priority to Chinese Application No. 2023117435156, filed Dec. 19, 2023, the content of which is incorporated herein by reference in its entirety.

TECHNICAL FIELD

The disclosure belongs to the field of board processing, and specifically relates to a floor slab unit with chamfers, a processing method, and a processing device.

BACKGROUND

Flooring manufacturers on the market choose to process chamfers on two sides or four sides of a wear-resistant layer on an upper surface of a floor slab unit to improve the three-dimensional effect and overall texture of floor splicing, making it more solid wood.

At present, there are generally two ways for chamfering.

The first way is to form chamfers by means of mold pressing. Taking wood-plastic flooring as an example, such as PVC wood-plastic flooring, the process usually includes mixing, extruding, carrying out laminating-embossing treatment, carrying out molded chamfering treatment, carrying out UV curing paint coating treatment, slicing and mortising in sequence, so as to obtain floor slab units with chamfers.

The following problems may arise when the first way is adopted.

1. The cutting carried out after chamfering requires a very high cutting accuracy and has a difficulty in dimension control. Large and small chamfering are prone to occur, that is, the chamfers are not evenly cut, and the defective rate is high.
2. Due to the use of mold pressing (generally hot pressing) to form chamfers, and the need for mortising at the chamfers, the strength at a joint between mortise lock buckles is reduced.
3. For ultra-thin boards, chamfering cannot be achieved in this way. If the boards with thicknesses of less than 5 mm is subjected to chamfering by mold pressing, the stress will be concentrated in the mold pressing position for a short time, which will damage the boards and lead to the rupture of the boards.

The second way is to form chamfers by beveling, rotary cutting or milling with a cutting tool.

The following problems may arise when the second way is adopted.

The chamfer formed by cutting has a significant difference in surface glossiness compared to other uncut parts of a board, which affects the three-dimensional effect and overall texture of floor splicing.

Therefore, a new way is needed to form a chamfered structure that connects the edges of floor, which allows it not only does not affect the performance of the floor itself, but also presents a more excellent three-dimensional effect and overall texture.

SUMMARY

It is a first object of the disclosure to provide a floor slab unit with chamfers.

The following technical solution is adopted.

A floor slab unit with chamfers includes at least a substrate layer and a finish paint layer which are disposed sequentially; the floor slab unit includes a body area and a chamfered area formed on at least one edge; the finish paint layer thickness of the chamfered area is equal to that of the body area; and the difference between the surface glossiness of the chamfered area and the surface glossiness of the body area is no more than 1.

Exemplarily, the difference between the surface glossiness of the chamfered area and the surface glossiness of the body area is no more than 0.5, preferably no more than 0.4, preferably no more than 0.3, preferably no more than 0.2, preferably no more than 0.1, and preferably 0. The glossiness is controlled within a range of 0-12 degrees. Exemplarily, the surface roughness of the chamfered area is basically the same as that of the body area.

The chamfered area may have a planar structure or an arc-shaped structure. More preferably, the chamfered area has the arc-shaped structure, which is generally considered having more excellent three-dimensional and visual effects, and thus enables the floor slab unit to be more integrated and three-dimensional after splicing.

It is a second object of the disclosure to provide a processing method for a floor slab unit with chamfers.

The following technical solution is adopted.

The processing method for a floor slab unit with chamfers includes the following steps:

S1. cutting an extruded whole board into a board unit with desired length and width;

S2. mortising and chamfering side edges of the board unit; and

S3. forming a finish paint layer on the surface of the chamfered board unit to obtain the floor slab unit.

As for the two crucial properties of floor, one is its own chemical and mechanical properties, such as wear resistance, water resistance, weather fastness, and strength, and the other is the visual effect brought to users. After the above-mentioned processing method of the disclosure is adopted, it is possible to overcome the problem of reducing the connection strength of floor slab units due to the pursuit of visual effects in the prior art, while ensuring overall visual effect improvement, with the surface performance being not affected.

In the first aspect of the above technical solution, the chamfers are formed by cutting, which avoids a series of problems caused by using the mold pressing way to form chamfers discussed in the background art. On the other hand, the problem of inconsistent surface glossiness caused by cutting a finish paint layer can be avoided by carrying out the step of forming the finish paint layer after the step of forming the chamfers, and the integrity of the finish paint layer can be guaranteed, which ensures that the surface properties of floor are not affected.

Exemplarily, the chamfers are planar chamfers or arc-shaped chamfers, preferably the arc-shaped chamfers.

Exemplarily, before the cutting in step S1, a colored film layer and a wear-resistant layer are also provided on the extruded whole board.

It is a third object of the disclosure to provide a chamfer processing device for forming the above chamfers.

The following technical solution is adopted.

The chamfer processing device includes cutting blades, and bases where the cutting blades can be mounted; each of the cutting blades includes a blade body and a cutting edge portion located on one side of the blade body; and the cutting edge portions are flat cutting edge portions capable of forming the planar chamfers, or arc-shaped cutting edge portions capable of forming the arc-shaped chamfers.

Exemplarily, the arc angles of the arc-shaped cutting edge portions are within a range of 10-50 degrees, and the arc lengths of the arc-shaped chamfers formed by the arc-shaped cutting edge portions are 2-5 mm.

Exemplarily, each of the arc-shaped cutting edge portions includes an arc-shaped cutting segment at a front end, and a linear cutting segment positioned at a rear end of the arc-shaped cutting segment. Due to provision of the linear cutting segments, the formed chamfers allow the chamfered area and the body area of the floor slab unit to have better continuity, thus making joints more natural and achieving a better visual effect.

Exemplarily, a front guide portion is provided at the front end of each of the arc-shaped cutting edge portions. Due to arrangement of the front guide portions, a board to be cut can be limited; and furthermore, the front guide portions assist a positioning device to locate parts to be cut, which is beneficial to improvement of cutting accuracy.

Exemplarily, the chamfer processing device further includes a disc seat, and the plurality of bases are mounted on a circumference of the disc seat.

It is a fourth object of the disclosure to provide a processing system for a floor slab unit with chamfers.

The following technical solution is adopted.

The processing system for a floor slab unit with chamfers, which is used for mortising and chamfering board units formed by cutting. The processing system includes a board conveying line, and a chamfer processing device and a mortise processing device which are disposed along the conveying direction of the board conveying line. The chamfer processing device and the mortise processing device are disposed on the same conveying line, and mortising and chamfering are completed on the same conveying line, so that the production efficiency is greatly improved. There is no special restriction on the sequential order of the chamfer processing device and the mortise processing device.

Due to implementation of the above technical solutions, the disclosure has the following advantages.

Through the specific processing device and the specific processing method, the disclosure can solve the problem that the connection strength of floor slab units is reduced, while ensuring overall visual effect improvement. Moreover, the surface performance is not affected, and better three-dimensional effects and overall texture are achieved.

Figure 1:
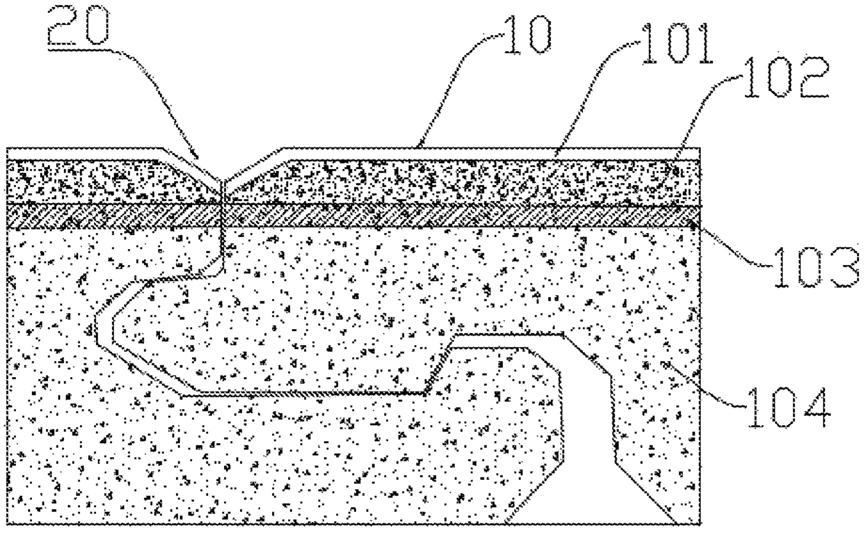
FIG. 1 is a schematic diagram of a floor slab unit obtained from an implementation of the disclosure.

In figures, 10 denotes a body area, 20 denotes a chamfered area, 104 denotes a substrate layer, 103 denotes a colored film layer, 102 denotes a wear-resistant layer, 101 denotes a finish paint layer, 301 denotes bases, 302 denotes cutting blades, 302*a* denotes front guide portions, 302*b* denotes arc-shaped cutting segments, and 302*c* denotes linear cutting segments.

DETAILED DESCRIPTION

The disclosure will be further described in detail with reference to the accompanying drawings and specific embodiments.

It should be noted that the following embodiments are only used to illustrate the technical solutions of the disclosure and not intended to limit the disclosure. Although the disclosure has been described in detail with reference to the foregoing embodiments, those of ordinary skill in the art should understand that: they can still modify the technical solutions contained in the foregoing embodiments, or make equivalent replacements for some of the technical features; and these modifications or replacements do not make the essence of the corresponding technical solutions depart from the scope of the technical solutions of the various embodiments of the disclosure.

Embodiment

The purpose of this embodiment is to produce floor slab units with chamfers; and during flooring, the floor slab units are connected through locking buckle structures of mortises. The structures of the floor slab units in this embodiment are basically the same as those of the existing floor slab units with chamfers. A floor body area with a cuboid structure has a pair of long sides and a pair of short sides, where one of the long sides/short sides is mortised, and the other long side/short side is provided with a tenon; and the adjacent floor slab units are connected with each other by means of mortise structures. A chamfered area is also provided at each of the edges of the two long sides. To achieve different visual effects, in another embodiment, chamfers are also provided at the edges of the two short sides.

From the perspective of the hierarchical structure of the floor slab unit, there is no significant difference from the existing floor slab unit with chamfers, including a buffer layer at the bottom, a substrate layer above the buffer layer, a colored film layer above the substrate layer, a wear-resistant layer above the colored film layer, and a finish paint layer above the wear-resistant layer. The substrate layer may be of a single-layer or a multi-layer structure, and the colored film layer, also known as a decorative layer, is a layer of structure that provides wood grain patterns for floor. The colored film layer may be formed by attaching a film with wood grain patterns, or printing the wood grain patterns on the substrate layer by using a printing technology so as to achieve a decorative effect resembling wood grain. The wear-resistant layer provides sufficient wear resistance for the floor, and the colored film layer is generally coated with the wear-resistant layer to form the wear-resistant layer. The finish paint layer is a protective layer of the floor, and a UV coating is usually used as the finish paint layer. This coating has characteristics such as wear resistance, scratch resistance, stain resistance, and UV resistance, which can prevent the floor from being affected by daily use and light exposure.

The floor slab unit may also include a buffer layer or sound-absorbing layer formed below the substrate layer.

Unlike the existing floor slab unit with chamfers, the floor slab unit provided in this embodiment has a floor finish paint layer thickness basically the same as the finish paint layer thickness of a body area, a surface glossiness basically the same as the surface glossiness of the body area, and a surface roughness basically the same as the surface roughness of the body area. Such basic similarity refers to the fact that in the opinions of those skilled in the art, they are the same. For example, in case of coating under the premise of the same coating process and coating equipment, the floor finish paint layer thicknesses are considered to be basically the same. Different flooring materials may be treated by using different surface treatment techniques in a manufacturing process, such as UV coating, matte coating, and glossy coating.

These treatment materials and techniques directly affect the surface glossiness of the floor. Finish paint layers formed by using the same finish paint are considered to have basically the same glossiness, and usually, the difference in glossiness between the two finish paint layers is less than 1. When floor finish paint layers are coated under the premise of the same coating process and coating equipment, it is considered to result in the formed surface roughnesses that are basically the same.

In a specific embodiment, the chamfers are planar chamfers, as shown in FIG. 1.

Figure 2:
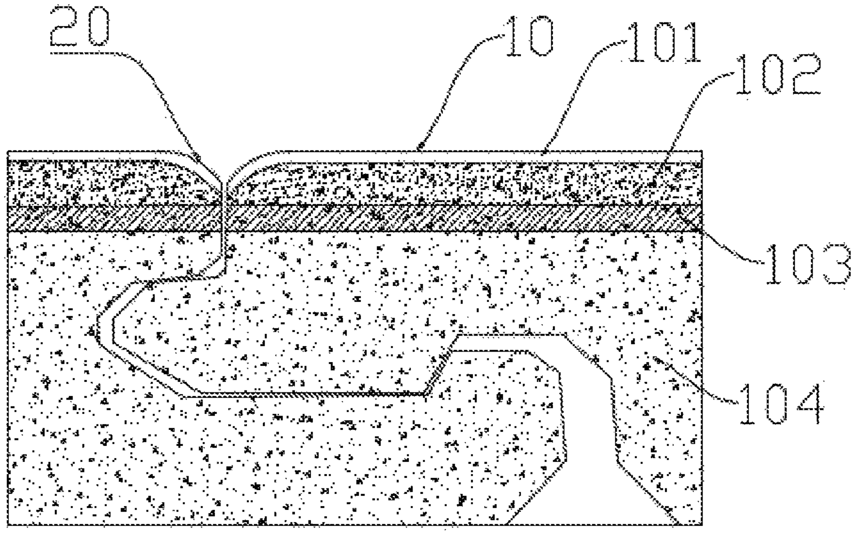
FIG. 2 is a schematic diagram of a floor slab unit obtained from another implementation of the disclosure.

In a specific embodiment, the chamfers are arc-shaped chamfers, as shown in FIG. 2. The long side (longitudinal) chamfered arc scraping surface is 3 mm-5 mm, which is 3 mm in this embodiment. The short side (transverse) chamfered arc scraping surface is 2 mm-4 mm, which is 3 mm in this embodiment.

The floor slab units provided in this embodiment are different from the existing floor slab units with chamfers, which are achieved by a specific processing method.

Therefore, this embodiment also provides a processing method for achieving the floor slab unit provided in the above embodiment, including the following steps:

- S0. feeding the raw materials of a substrate layer into an extruder to extrude a board, forming a colored film layer and a wear-resistant layer on an upper surface of the board, and setting a buffer layer on a lower surface of the board by means of adhesive;
- S1. cutting the whole board obtained in step S0 into a board unit with desired length and width;
- S2. mortising and chamfering side edges of the board unit, where taking long sides as an example, one of the long sides is grooved, the other long side is tenoned, and both long sides are chamfered; and
- S3. forming a finish paint layer on the surface of the chamfered board unit to obtain the floor slab unit, which is usually the smallest unit for floor splicing.

For implementation of the above processing method, this embodiment provides a processing system for a floor slab units with chamfers, which is optimized on the basis of the existing processing system, and thus greatly improves the production efficiency.

Before mortising and chamfering, devices applied by the system for implementing steps S0 and S2 are the same as those applied in the prior art. The improvement of the processing system mainly lies in mortising and chamfering performed on board units formed by cutting. The processing system includes a board conveying line, and a chamfer processing device and a mortise processing device which are disposed along the conveying direction of the board conveying line. The chamfer processing device and the mortise processing device are disposed on the same conveying line, and mortising and chamfering are completed on the same conveying line, so that the production efficiency is greatly improved. There is no special restriction on the sequential order of the chamfer processing device and the mortise processing device. In this embodiment, the mortise processing device includes a groove forming device and a tenon forming device, the chamfering processing device is disposed between the groove forming device and the tenon forming device, and the groove forming device and the tenon forming device are devices already existing in the prior art.

The chamfer processing device has a structure of including cutting blades, and bases where the cutting blades can be mounted; each of the cutting blades includes a blade body and a cutting edge portion located on one side of the blade body; and depending on the shapes of the chamfers to be formed, the cutting edge portions for selection may be flat cutting edge portions capable of forming the planar chamfers, or arc-shaped cutting edge portions capable of forming the arc-shaped chamfers.

Figure 3:
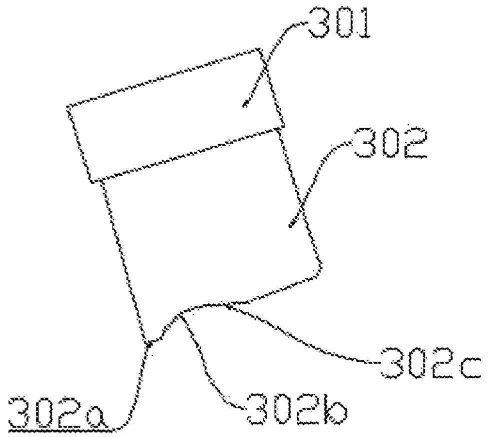
FIG. 3 is a schematic diagram of the structure of a chamfer processing device according to the disclosure.

The structure of the flat cutting edge portion is a common linear cutting edge structure, as shown in FIG. 3.

Figure 4:
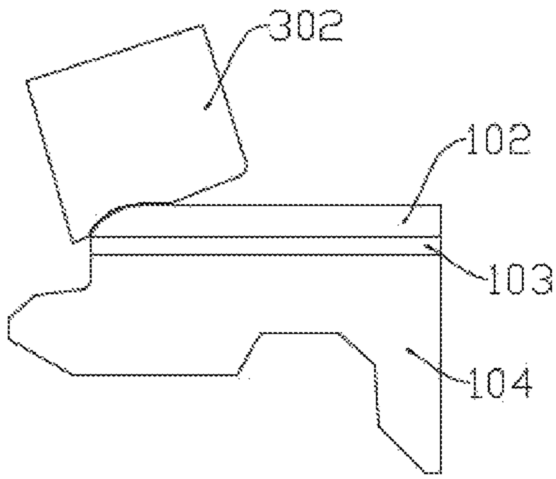
FIG. 4 is a schematic cutting diagram of the chamfer processing device according to the disclosure.

The structure of the arc-shaped cutting edge portion, as shown in FIG. 4, includes an arc-shaped cutting segment at a front end, and a linear cutting segment positioned at a rear end of the arc-shaped cutting segment. Due to provision of the linear cutting segment, the formed chamfer allows the chamfered area and the body area of the floor slab unit to have better continuity, thus making joints more natural and achieving a better visual effect. The angles of the arc-shaped cutting segments are −10 degrees to 50 degrees. By adjusting the installation angles of the cutting blades, the arc-shaped chamfers with desired radians are obtained.

In this embodiment, it is also preferred to provide a front guide portion at the front end of each of the arc-shaped cutting edge portions. Due to arrangement of the front guide portions, a board to be cut can be limited; and furthermore, the front guide portions assist a positioning device to locate parts to be cut, which is beneficial to improvement of cutting accuracy. Even if there is a small amplitude of vibration displacement, due to the existence of the front guide portions, the board will be accurately chamfered.

In another specific implementation, the chamfer processing device further includes a disc seat, which is rotatably installed on one side of the board conveying line. The plurality of bases is mounted on a circumference of the disc seat, and the cutting blades are installed on the bases. The design of the disc seat can facilitate the replacement of the cutting blades. For example, when one of the cutting blades is passivated or damaged after being used for a long time, the disc seat can be rotated for replacing the old cutting blade with another new cutting blade, which makes the operation simpler and the replacement time shorter. The same cutting blades may be mounted on the different bases, or the different cutting blades may be mounted on the different bases, depending on the sizes and shapes of the formed chamfers.

Comparative Example

A processing method for a floor slab unit in this Comparative Example is different from that provided in the above embodiment, including the following steps:

- S0. feeding the raw materials of a substrate layer into an extruder to extrude a board, forming a colored film layer, a wear-resistant layer and a finish paint layer on an upper surface of the board, and setting a buffer layer on a lower surface of the board by means of adhesive;
- S1. rolling an arc-shaped groove with a roller press on the whole board obtained in step S0, and cutting the board at the arc-shaped groove to obtain a board unit; and
- S2. mortising side edges of the board unit, where taking long sides as an example, one of the long sides is grooved, the other long side is tenoned, so as to obtain the floor slab unit.

The two floor slab units obtained in the embodiment and the comparative example are connected, and the strengths at joints between mortise lock buckles are measured by a tensile testing machine ts176, and the test results are as follows:

| | Tension on short sides | Tension on long sides |
|---|---|---|
| Embodiment | 441.6N | 339N |
| Comparative Example | 1146.2N | 992.5N |

What is claimed is:

1. A floor slab unit with chamfers, comprising at least a substrate layer and a finish paint layer which are disposed sequentially, and the floor slab unit comprising a body area and a chamfered area formed on at least one edge, wherein the finish paint layer thickness of the chamfered area is equal to that of the body area, and the difference between a surface glossiness of the chamfered area and a surface glossiness of the body area is no more than 1; wherein the chamfered area is formed by a cutting method before the finish paint layer is formed by paint coating.

2. The floor slab unit with chamfers according to claim 1, wherein a surface roughness of the chamfered area is basically the same as that of the body area.

3. The floor slab unit with chamfers according to claim 1, wherein the chamfered area is of a planar or arc-shaped structure.

* * * * *